US00RE34057E

United States Patent [19]

Middlesworth

[11] E Patent Number: Re. 34,057

[45] Reissued Date of Patent: Sep. 8, 1992

[54] STEERING MECHANISM FOR A ZERO TURNING RADIUS VEHICLE

[75] Inventor: Tommy A. Middlesworth, Sheboygan Falls, Wis.

[73] Assignee: Simplicity Manufacturing, Inc., Port Washington, Wis.

[21] Appl. No.: 736,853

[22] Filed: Dec. 12, 1990

Related U.S. Patent Documents

Reissue of:

[64] Patent No.: 4 7 903 99
Issued: Dec. 13, 1988
Appl. No.: 165,760
Filed: Mar. 9, 1988

[51] Int. Cl.[5] ..... B62D 6/00

[52] U.S. Cl. ..... 180/6.2; 180/628; 180/632; 180/6.5; 180/236; 280/771; 74/471 XY

[58] Field of Search ..... 280/771; 180/6.2, 6.24, 180/6.26, 6.28, 6.32, 6.34, 6.36, 236, 6.48, 6.50; 74/471 R, 471 XY

[56] References Cited

U.S. PATENT DOCUMENTS

| | | | |
|---|---|---|---|
| 1,984,399 | 12/1934 | Davidson | 180/6.32 |
| 2,659,445 | 11/1953 | Church | 180/6.32 |
| 2,886,118 | 5/1959 | Strunk | 180/6.26 |
| 3,305,116 | 2/1967 | McKee | 180/236 |
| 3,362,493 | 1/1968 | Davis et al. | 180/6.32 |
| 3,384,194 | 5/1968 | Newhouse | 180/6.2 |
| 3,611,827 | 10/1971 | Bottum et al. | 74/471 XY |
| 3,698,498 | 10/1972 | Stanford | 180/6.2 |
| 4,154,314 | 5/1979 | Tsusi et al. | 180/6.2 |
| 4,353,284 | 10/1982 | Billottet | 180/236 |
| 4,446,941 | 5/1984 | Laurich-Trost | 180/236 |

OTHER PUBLICATIONS

Advertisement for Grasshopper Zero-Turning Radius Mower.

Advertisement for Dixon Zero Turning Radius Mower.

*Primary Examiner*—Kenneth R. Rice

*Attorney, Agent, or Firm*—Reinhart, Boerner, Van Deuren, Norris & Rieselbach

[57] ABSTRACT

A driving and steering mechanism for a vehicle having a pair of driving wheels includes a steering wheel rotatably mounted to the vehicle and an accelerator foot pedal pivotably mounted to the vehicle. Transmissions associated with the driving wheels include a pivotable control arm for controlling the operation of the transmission, which independently controls the speed and direction of rotation of the associated wheel. The vehicle is turned by causing one wheel to rotate faster than the other wheel. A zero turning radius turn can be effected by causing the driving wheels to rotate in opposite directions.

The driving and steering mechanism includes a pair of floating links pivotably connected at one end to a respective transmission control arm. Steering links, associated with the steering wheel, are pivotably connected to a respective floating link distal the connection to the control link. Accelerator links, associated with the accelerator foot pedal, are pivotably connected to a respective floating link at a point between the control arm and steering link pivot points. The floating links operate to integrate outputs from the steering wheel and the accelerator foot pedal into a pair of outputs applied to the pair of control arms, thereby controlling the speed and direction of rotation of a respective driving wheel in response to the prescribed steerage and speed.

21 Claims, 2 Drawing Sheets

STEERING MECHANISM FOR A ZERO TURNING RADIUS VEHICLE

Matter enclosed in heavy brackets [ ] appears in the original patent but forms no part of this reissue specification; matter printed in italics indicates the additions made by reissue.

BACKGROUND OF THE INVENTION

The present invention relates to a steering mechanism for vehicles, and particularly to vehicles employing a sharp turning radius. The present invention also relates to steering mechanisms for vehicles which employ a pair of independently controlled driving wheels.

A variety of motor driven vehicles applications require that the vehicle be capable of negotiating sharp turns, such as a garden tractor or a riding lawnmower. In vehicles of this sort, a pair of drive wheels powered by a small horsepower motor provide the motive force for the vehicle. In order to provide steerage for the vehicle, the driving wheels are provided with independent controls and with independent hydrostatic or variable speed mechanical transmissions.

In one example of a vehicle of the type described, a steering mechanism, such as that described in the patent to Tsuji, et al., U.S. Pat. No. 4,154,314, provides independent control of the speed of each of the driving wheels, such that in negotiating a turn, one wheel is slowly braked while the speed of the other wheel is increased. The Tsuji, et al. steering mechanism uses a control lever corresponding to each of the driving wheels. Lever-type controls of this nature have several problems - for instance, they may be difficult to control around the neutral position, that is, a hopping action may result around neutral when the operator and/or the control lever is moving in one direction and the vehicle is moving in the opposite direction. Another problem is that a typical consumer using a riding lawn mower may find it confusing to use a lever that controls both the vehicle speed and the steering. A steering wheel is more natural to the average consumer who has not had much exposure to machines controlled by levers. Finally, although the Tsuji, et al. device provides for a small turning radius, it does not provide for a zero turning radius - that is, a vehicle turn effectively made about the midpoint of the driving wheel axis.

One device described in a patent to Davis, et al., U.S. Pat. No. 3,362,493, provides the capability of performing a zero turn radius by the vehicle. However, the Davis, et al. device is a complicated assemblage of cams, levers and linkages. In addition, a separate forward-reverse direction control is required to change the direction of motion of the vehicle. Finally, although the Davis, et al. device can produce a zero turning radius, there is no provision in Davis, et al. for a reduction in vehicle speed as the vehicle steerage is increased. That is, when the vehicle is moving at a zero turning radius, there is no provision for reducing or limiting the speed the vehicle moves around the turn, thus creating a risk of tipping the vehicle during a sharp turn.

SUMMARY OF THE INVENTION

A driving and steering mechanism for a vehicle having a pair of driving wheels comprises a pair of reversible motors, one for each one of the driving wheels. Each of the reversible motors includes a mechanism for controlling the speed and direction of rotation of each one of the driving wheels independently of the other, thereby controlling the actual speed and actual steerage of the vehicle. A steering mechanism is included, operable by the operator of the vehicle to prescribe a steerage for the vehicle and having a first output representing the prescribed steerage. An accelerator mechanism associated with the vehicle is also operable by the operator of the vehicle to prescribe a speed for and the forward/reverse direction of the vehicle and has a second output representing this prescribed speed and direction. An integrator linkage integrates the first and second outputs into a third output applied to the motor controlling mechanism to coordinate the speed and direction of rotation of each of the reversible motors in response to the prescribed steerage and the prescribed speed. The integrator linkage is also operable to reduce the actual vehicle steerage relative to the prescribed steerage as the prescribed speed is increased.

DESCRIPTION OF THE PREFERRED EMBODIMENT

Figure 1:
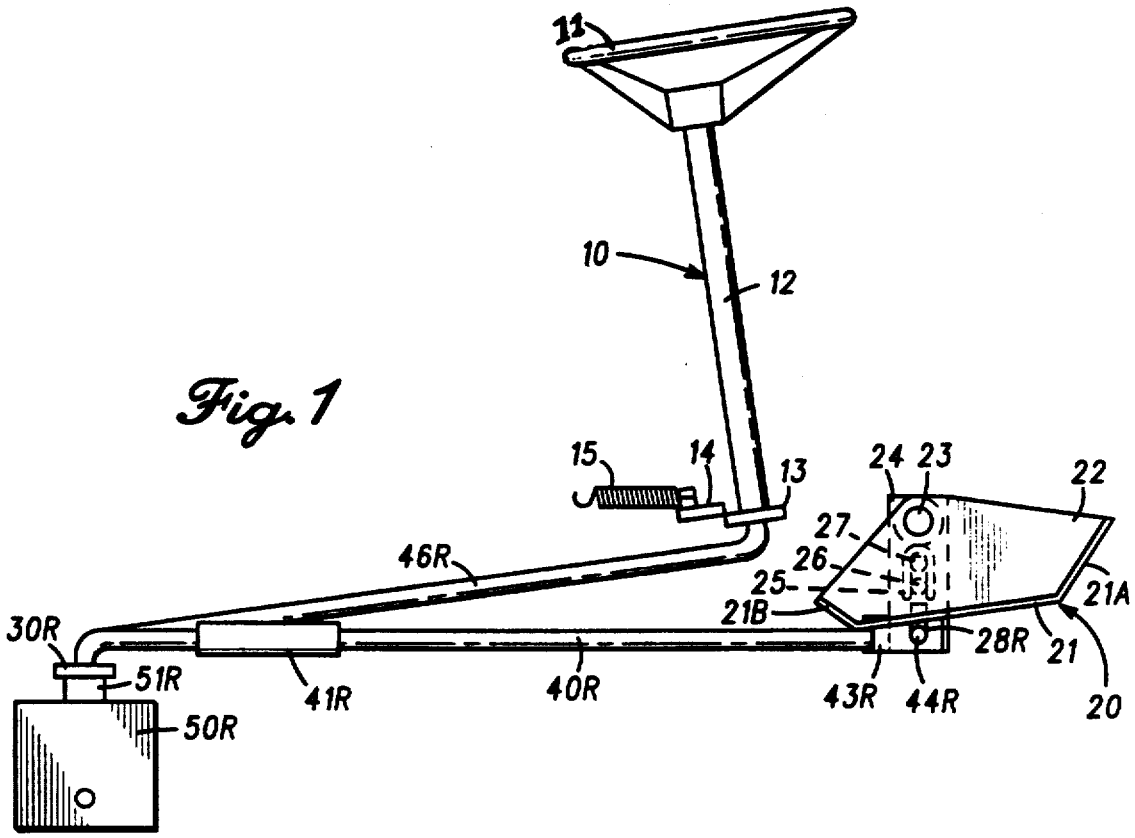
FIG. 1 is a side elevational view of a steering mechanism according to the preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
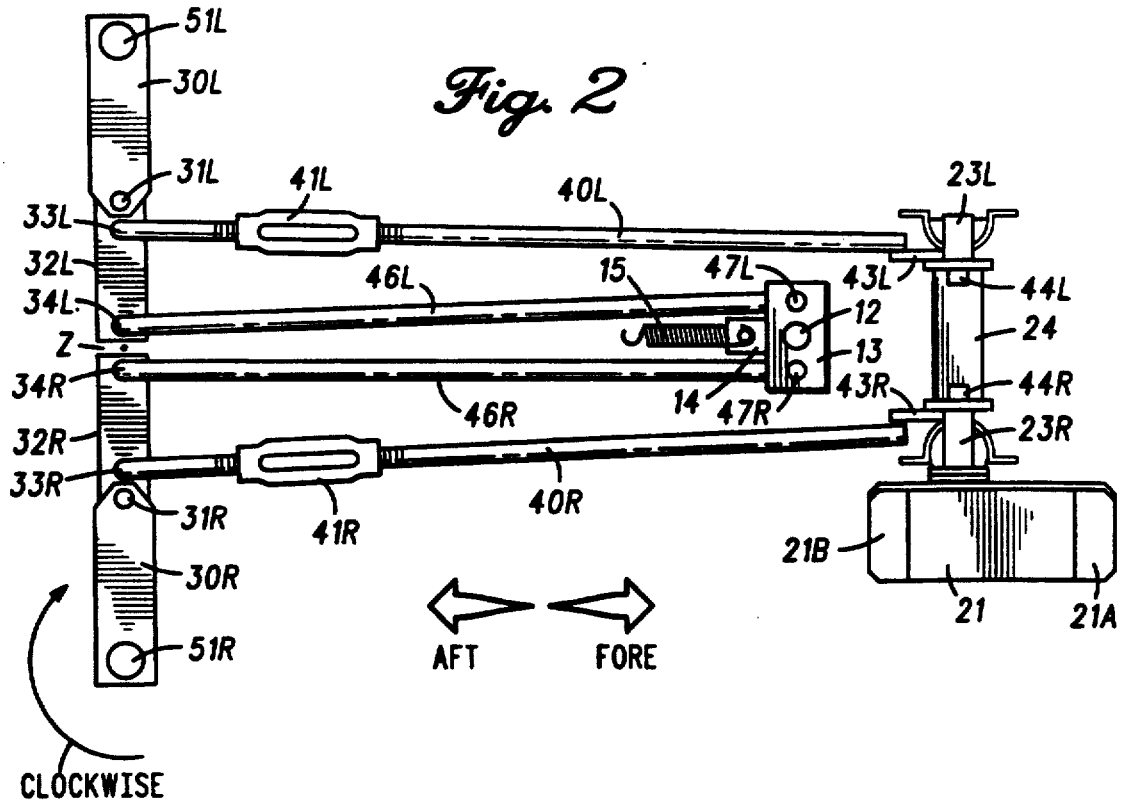
FIG. 2 is a top elevational view of the steering mechanism shown in FIG. 1.

Referring to FIGS. 1 and 2, a vehicle steering mechanism is shown in detail as comprising a steering mechanism 10 and an accelerator mechanism 20 that provides input to a pair of transmissions 50R and 50L. The transmissions 50R and 50L, respectively, provide power input to a corresponding pair of right and left driving wheels, not shown in the figures, such as driving wheels for a typical garden tractor. The transmissions 50R and 50L operate independently of each other, and each may comprise a hydrostatic transmission or a variable speed mechanical transmission, as are commonly available in the market.

The vehicle steering system is symmetric about the vehicle centerline, thus the system includes right and left-hand components. Right-hand components are identified by the suffix "R" and left-hand components by the suffix "L". For simplicity, only the right-hand component will be described, it being understood that the left-hand counterpart is of identical, albeit mirrored, design.

Steering mechanism 10 includes a steering wheel 11 mounted atop a steering shaft 12 that is rotatably mounted to the vehicle body in a conventional fashion. The steering shaft 12 terminates distal the steering wheel in a steering shaft plate 13. A centering plate 14 is affixed to the steering shaft plate 13, and a centering spring 15 is mounted between the vehicle body and the centering plate 14 by a conventional means, such as a peg or other similar spring retaining device. The spring 15, in the preferred embodiment, is a helical tension spring that has a spring constant sufficiently strong to overcome the mechanical resistance of the steering system herein described, in order to restore the centering plate and steering shaft plate to its original neutral position. However, the centering spring 15 is not so strong that the operator would be required to exert a great deal of force in order to turn the steering wheel 11. The centering spring 15 and centering plate 15 operate to restore the steering mechanism to the neutral steerage position, that is, with the vehicle moving in a straight line rather than in a turning radius.

Accelerator mechanism 20 includes a foot pedal 21 integral with a pedal side plate 22. Pedal side plate 22 is affixed to accelerator bracket 24 by a pedal pivot axle 23R. A second pedal pivot axle 23L is affixed to the left-hand side of accelerator bracket 24. Both pedal pivot axles 23R and 23L are bearingly mounted to the vehicle body in a conventional fashion. The accelerator mechanism 20 is spring-loaded to a neutral position so that the vehicle remains stationary when no pressure is applied to the foot pedal 21.

In the preferred embodiment, the pedal is spring-loaded using a neutral spring 25, which can be a single coil helical torsion spring that is mounted over the pedal pivot axle 23R. The free ends of the neutral spring 25 react against restoring pins 26 and 27. Pin 26 is secured to the side plate 22 and moves with the foot pedal 21. Pin 27 is fixed to the vehicle frame and does not move. As the foot pedal 21 is rotated, the restoring pins 26 and 27 force the free ends of the neutral spring 25 apart. When the foot pedal 21 is released, the torsional stiffness of the neutral spring 25 forces the restoring pins 26 and 27 into the vertical alignment, as shown in FIG. 1.

The foot pedal 21 includes pedal sections 21A and 21B. When pressure is applied to pedal sections 21A, the foot pedal 21 rotates in a clockwise direction around pedal pivot axle 23, which corresponds to a forward direction of operation for the vehicle, as translated through the linkage system, to be described herein. On the other hand, when pressure is applied to pedal section 21B, foot pedal 21 rotates in a counterclockwise direction, which corresponds to a reverse direction of operation for the vehicle. Thus, the accelerator mechanism 20 not only provides speed control for the vehicle, but it also provides forward/reverse direction control. Pedal sections 21A and 21B can be sloped upwardly as shown in FIG. 1, or they may be generally flat, depending upon which configuration is most comfortable for the vehicle operator.

Each of the transmissions 50R and 50L include a vertical control shaft, 51R and 51L, respectively. The vertical control shafts 51R and 51L are rotated to provide control of the transmission direction and speed of rotation. In the preferred embodiment, a counterclockwise rotation of the right vertical control shaft 51R (as viewed from FIG. 2) produces a forward rotation of the transmission 50R and the corresponding right-hand drive wheel. On the other hand, a clockwise rotation of control shaft 51L provides for forward operation of the corresponding left-hand drive wheel. Operation of the drive wheels in reverse is accomplished by opposite-hand rotations of the respective control shafts.

The speed of the drive wheel is controlled by the amount of rotation of the vertical control shaft 51R - the greater the angular rotation of the vertical control shaft, the greater the rotational velocity of the transmission 50R and the right drive wheel. Since the transmissions 50R and 50L, and their respective right and left drive wheels, are independent of each other, each may rotate at a different rotational speed and direction. Turning the vehicle is accomplished by causing the right and left drive wheels to rotate at different rotational speeds. For instance, for a gradual right-hand turn, both transmissions 50R and 50L, and their respective drive wheels, are rotating in the same direction corresponding to the forward direction of travel for the vehicle. However the left transmission 50L, and left drive wheel, rotate at a faster rotational speed than their right-hand counterparts, The amount of steerage, or the sharpness of the turn, is dictated by the speed differential between the right and left-hand transmission 50R and 50L and associated drive wheels. The larger the speed differential between the right and left-hand drive wheels, the sharper the turn.

The vehicle can be caused to turn about one of the drive wheels by stopping the rotation of that drive wheel and driving the opposite drive wheel. In a typical lawn tractor, this type of turn is the sharpest turn permitted by the steering system for the vehicle. However, greater steerage or sharper turn angles are desirable and beneficial. In order to effect sharper turn angles, the right and left-hand drive wheels must rotate in opposite directions. When the drive wheels are oppositely rotating, the vehicle turns about a point along the centerline of the vehicle intersecting the axis of the drive wheels. In the preferred embodiment, this "zero turn radius" is generated by rotating the right-hand vertical control shaft 51R in one direction and the left-hand vertical control shaft 51L in the other direction, which causes the respective transmissions 50R and 50L to rotate in opposite directions as well as their associated drive wheels. In order to accommodate the sharp turning angles, the vehicle of the preferred embodiment includes caster-type ground-engaging wheels, other than the drive wheels. These caster-type wheels, not shown in the figures, are capable of a 360° rotation so as not to interfere with the vehicle turning action.

The rotation of the vertical control shaft 51R (as well as control shaft 51L) and, consequently, the direction and speed of rotation of the transmission 50R (and 50L) and the associated drive wheel, is controlled by a set of linkages and links, shown in detail in FIG. 2. A control arm 30R is affixed to vertical control shaft 51R and rotates with that shaft to control the manner of operation of transmission 50R. A floating link 32R is pivotably attached to control arm 30R at control pivot point 31R. The floating link 32R is "floating" in the sense that it is not connected to a fixed pivot point, that is, a pivot point fixed in the vehicle, such as the pivot point for control arm 30R (i.e., vertical control shaft 51R). As will be described herein, floating link 32R rotates about a variety of temporary pivot points depending upon the state of the steering mechanism 10 and the accelerator mechanism 20.

Foot pedal link 40R attaches to floating link 32R at accelerator pivot point 33R. Foot pedal link 40R spans between floating link 32R and the accelerator mechanism 20, connecting to a spanner bracket 43R which is pivotably mounted to accelerator bracket 24 at front pivot point 44R. Thus, as the foot pedal 21 is depressed, the pedal rotates around pedal pivot axle 23R, which in turn causes accelerator bracket 24 to rotate about the same axle. As the accelerator bracket 24 rotates, it imparts a fore and aft motion (as designated by the heavy arrows in FIG. 2) to the spanner bracket 43R and the foot pedal link 40R. Since the front pivot point 44R moves along an arc as the accelerator bracket 24 is rotated, the spanner bracket 43R pivots relative to the accelerator bracket 24 to allow the foot pedal link 40R to remain unbent during the operation of the accelerator mechanism. As the foot pedal 21 is depressed, the foot pedal link 40R moves either fore or aft, depending upon which section 21A or 21B of the foot pedal is depressed. As the foot pedal link 40R moves fore and aft, the accelerator pivot point 33R on floating link 32R also moves fore and aft. The ultimate effect of this fore and aft motion of accelerator pivot point 33R on the motion of control arm 30R can only be determined with reference to the actuation state of the steering mechanism 10.

Actuation of the steering mechanism 10 provides input into the steering system through a steering link 46R that is pivotably attached to floating link 32R at steering pivot point 34R situated at the end of the floating link distal the control pivot point 31R. The steering wheel link 46R also attaches to steering shaft plate 13 at steering front point 47R. With this arrangement, as steering wheel 11 and steering shaft 12 are rotated, steering front pivot point 47R moves fore and aft about an arc relative to the axis of the steering shaft 12. As the steering front pivot point 47R rotates, steering wheel link 46R is moved either fore or aft, depending upon the direction of rotation of the steering wheel 11.

As steering link 46R moves fore and aft, steering pivot point 34R on floating link 32R also moves fore and aft. Like the foot pedal link 40R, the steering link 46R is pivotably mounted to the floating link and the steering shaft, to prevent any bending of the steering link during operation of the steering mechanism. It will be noted that with both the foot pedal link 40R and the steering link 46R each will translate somewhat within their respective horizontal planes, while moving fore and aft, in response to operation of the respective accelerator and steering mechanisms.

In the present invention, floating link 32R acts as an integrator to combine the inputs from the steering mechanism 10 and the accelerator mechanism 20. The floating link 32R senses the steering and accelerator inputs, as prescribed by the vehicle operator, and integrates the two inputs into a single output at the control pivot point 31R. This output at control pivot point 31R controls the rotation of control arm 30R and, consequently, the rotation of vertical control shaft 51R. The operation of this linkage mechanism, and, in particular the floating link 32R, is described with reference to the state diagrams shown in FIG. 3. In the state diagrams, both the right and left-hand portions of the steering system are shown, since, as previously described, the vehicle steerage is determined by the relative speed and direction of rotation of the right and left drive wheels.

Figure 3:
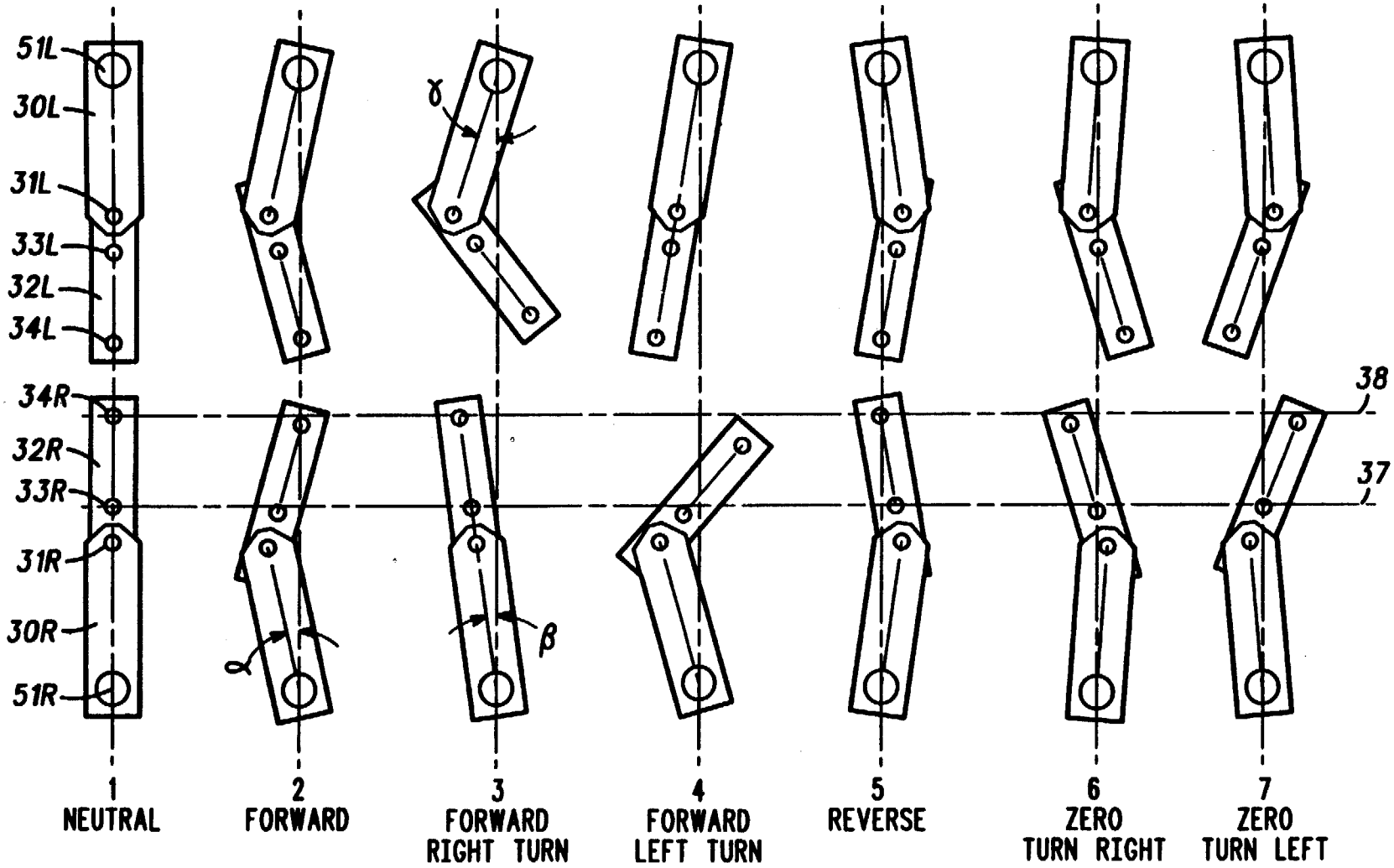
FIG. 3 is a top schematic view of the positions of the control arms and floating links of the steering mechanism of FIG. 1, shown for several prescribed speeds, turning radii and directions of vehicle travel.

In the neutral state, represented by "State 1" in FIG. 3, the control arms 30R and 30L and floating links 32R and 32L are in linear alignment generally parallel to the axle of the drive wheels. The phantom line 37 corresponds to the accelerator pivot neutral position and is aligned with the neutral position of accelerator pivot point 33R as shown in "State 1". Likewise, phantom line 38 represents the steering pivot neutral position and is aligned with the neutral position of steering pivot 34R in "State 1". These phantom lines are provided to clearly illustrate the displacement of the pivot points 33R and 34R during the operation of the steering linkage system.

"State 2" in FIG. 3 represents the forward straight-ahead motion of the vehicle. In this state, the steering mechanism is maintained in its neutral position, while the foot pedal 21 of the accelerator mechanism 20 is depressed at the forward portion 21A. Since the steering mechanism is not being utilized, steering pivot point 34R acts as a temporary pivot point for the floating link 32R. Thus, as the accelerator foot pedal 21 is depressed, the foot pedal link 40R and 40L move aft, thereby displacing the accelerator pivot points 33R and 33L aft. As these pivot points are moved aft, the floating link 32R rotates about steering pivot point 34R, causing the control pivot point 31R to be displaced in the aft direction. As a result, control arm 30R is rotated in the counterclockwise direction which causes vertical control shaft 51R to rotate in the counterclockwise direction leading to a forward rotation of the right drive wheel. Similarly, the left control arm 30L is rotated in the clockwise direction, corresponding to a forward rotation of the left drive wheel.

When a forward right turn is prescribed by the operator of the vehicle, the steering shaft 12 of the steering mechanism 10 is rotated, causing the steering wheel plate 13 to rotate. As the steering wheel plate 13 rotates, the right steering link 46R moves aft while the left steering wheel link 46L moves forward, which causes the right steering pivot point 34R to move aft and the left steering pivot point 34L to move forward, as shown in "State 3" in FIG. 3. If the foot pedal 21 is maintained at a constant prescribed speed orientation, accelerator pivot points 33R and 33L will act as temporary pivot points for the floating links 32R and 32L as input is received from the steering mechanism 10. It is seen in the diagram for "State 3" that is a right turn prescribed by the steering mechanism 10 causes the control pivot point 31L in the left-hand side of the system to move farther aft than the control pivot point 31R of the right-hand portion of the system. As described above, this causes a speed differential between the right and left drive wheels, with the left-hand drive wheel rotating faster than the right-hand drive wheel. Conversely, a forward left-hand turn is effected by turning the steering mechanism steering wheel 11 in the opposite direction, that is, counterclockwise, which ultimately causes the right drive wheel to rotate faster than the left drive wheel.

In reverse operation, as illustrated in "State 5", the vehicle operator depresses the reverse portion 21B of the foot pedal 21. This, in turn, causes the right and left foot pedal links 40R and 40L to move in the forward direction. If no steerage is applied to steering mechanism 10, steering pivot points 34R and 34L operate as temporary pivot points for floating link 32R and 32L, to translate the input from the accelerator mechanism 20 to a forward displacement of control arms 30R and 30L and vertical control shafts 51R and 51L. The resulting clockwise and counterclockwise rotations of the vertical control shafts 51R and 51L, respectively, cause the transmissions 50R and 50L to move the drive wheels concurrently in their reverse directions.

A zero turning radius turn is represented by "State 6" and "State 7" in FIG. 3. In a zero turning radius turn, as used in the present disclosure, the vehicle turns about a point at the midpoint of the drive wheel axis. That is, the vehicle turns about the point Z as defined by FIG. 2. In these states, the steering wheel 11 of the steering mechanism 10 is rotated sharply in either the clockwise or counterclockwise directions, depending upon the direction of turn desired. It can be noted, upon an examination of "States 6" and "7" in FIG. 3, that the accelerator pivot points 33R and 33L are exactly oriented upon the accelerator pivot neutral line 37. Thus, it is apparent that the speed and direction control of the right and left-hand transmissions 50R and 50L are determined solely by input from the steering mechanism 10. The accelerator pivot points 33R and 33L act as temporary pivot points for the floating links 32R and 32L as the steering pivots 34R and 34L are moved fore and aft by the steering links 46R and 46L, respectively. Thus, as steering wheel 11 is rotated fully to the clockwise direction, for instance, to cause a zero radius right-hand turn, as represented by "State 6" in FIG. 3, the left steering link 46L is moved forward while the right steering link 46R is moved aft to the fullest extents possible given that the steering pivot points 34R and 34L are, for all intents and purposes, fixed relative to the vehicle.

In the preferred embodiment, accelerator pivot point 33R is situated on floating link 32R between control pivot point 31R at the outboard end of link 32R and the steering pivot point 34R at the inboard end of the floating link. The distance between control pivot point 31R and accelerator pivot point 33R is roughly one-fourth the distance between control pivot point 31R and the steering pivot point 34R, in the preferred embodiment. Consequently, movement of the accelerator pivot point 33R (with the steering pivot point temporarily fixed) translates to a rotation of control arm 30R through an angle approximately four times larger than for an equal movement of the steering pivot point 34R (with the accelerator pivot point temporarily fixed), as is apparent from the application of simple geometric principles.

The present invention also contemplates switching the locations of the accelerator and steering pivot points on floating link 32R, as changing the distances of these pivot points from the control pivot point 31R. Changes of this nature will alter the manner in which the speed and steerage prescribed by the vehicle operator is translated by the floating link 32R and control arm 30R into actual vehicle motion. For instance, moving the steering pivot point 34R closer to the control pivot point 31R will increase the effect of movement of the accelerator and steering pivot points and will reduce the difference in control arm rotation due to equal movements of the accelerator pivot point and the steering pivot point.

It is seen from the state diagrams in FIG. 3 that the floating links 32R and 32L play a primary role in controlling the speed and direction of rotation of the left and right-hand transmissions 50R and 50L and the respective left and right-hand drive wheels. The floating links 32R and 32L act as integrators to receive the input from the steering mechanism 10 and the accelerator mechanism 20. In addition, the use of the floating links 32R and 32L helps to limit the amount of steerage available when the accelerator pedal is fully depressed, and to force a reduction in the speed prescribed by the operator on the accelerator pedal when increased steerage is desired. In other words, the steering system of the present invention operates to prevent an excessive combination of actual speed and actual steerage, as a safety precaution to prevent tipping the vehicle in a high speed turn.

Referring to FIG. 3, and in particular, "State 2" illustrated in FIG. 3, when a forward motion has been prescribed by the accelerator mechanism 20, control arm 30 is situated at an angle $\alpha$ relative to its neutral position. When the steering mechanism 10 is actuated, the angle of the control arm 30R relative to its neutral position is reduced to an angle $\beta$- that is, angle $\beta$ is less than angle $\alpha$. Likewise, at the left-hand component of the steering system, the control arm 30L moves to an angle $\gamma$, which represents an increase from the neutral angle $\alpha$ that equals the change in angle for control arm 30R (i.e., $\alpha-\beta$). The changes in angles of the control arms 30R and 30L from their neutral steering angles $\alpha$ correspond directly to a reduction in the rotational speed of the transmission 50R and the right drive wheel and an increase in the rotational speed of the transmission 50L and the left drive wheel. As previously explained, this speed differential between the right and left drive wheels, which is equivalent to the difference between the angles of the two control arms (i.e., $\gamma-\beta$), causes the vehicle to turn through a certain radius corresponding to the amount of steerage selected. As the vehicle speed is increased, the neutral angle $\alpha$ of the control arms 30R and 30L is increased and, for the same prescribed steerage, the angles $\beta$ and $\gamma$ are increased. However, the difference between the control arm angles, $\gamma-\beta$, is decreased due to the geometry of the links, which translates directly to a reduction in actual steerage of the vehicle.

The geometry of the steering linkage of the present invention also serves to force a reduction in prescribed speed when a sharper turning radius, or greater steerage, is desired by the operator. At a given prescribed steerage, the lengths of the control arm 30R, floating link 32R, steering link 46R and accelerator link 40R geometrically restricts the amount of fore and aft motion possible for the accelerator link 40R. Moreover, in a zero radius turn, such as shown in 'State 6' in FIG. 3, the vehicle speed is dictated solely by the movement of the steering mechanism 10, with the accelerator mechanism 20 situated in its neutral position. Any prescribed speed will move the accelerator pivot points 33R and 33L aft, which will move the control arms 30R and 30L counterclockwise and clockwise, respectively. With enough counterclockwise motion, control arm 30R will rotate from the orientation in 'State 6', corresponding to a reverse rotation of the right drive wheel, to an orientation such as shown in 'State 2', corresponding to a forward rotation of the right drive wheel. At this point, both drive wheels are rotating in the forward direction and the zero radius turn has been eliminated. In order to restore the zero radius turn, the vehicle operator must reduce the prescribed acceleration applied to the accelerator mechanism 20. From the foregoing description of the operation of the steering system, it is apparent that the linkage mechanism provides a significant safety feature to prevent a combination of high speed and sharp turning radius, which reduces the risk of the vehicle tipping over or of the operator losing control of the vehicle.

The foot pedal links 40R and 40L are each provided with a turnbuckle 41R and 41L, respectively, to adjust the effective length of the foot pedal links. The turnbuckles 41R and 41L are rotated to adjust the neutral position of the control arms 30R and 30L when the spring-loaded accelerator foot pedal 21 is in its neutral position. Alternatively, spanner brackets 43R and 43L can be L-shaped with a bore through one leg of the L-shape. The foot pedal links 40R and 40L can be provided with a threaded end that is secured through the bore in the spanner bracket by threaded nuts on either side of the bracket. Thus, the length of the foot pedal links 40R and 40L can be adjusted by threading the threaded end of the pedal link further onto the threaded nuts.

In addition, the accelerator bracket 24 is provided with adjusting slots 28R and 28L within which front pivot points 44R and 44L reside. Thus, when the front pivot points 44R and 44L are moved upward in slots 28R and 28L, the maximum input provided by the accelerator mechanism 20 is reduced relative to when the front pivot points are at the lower end of the adjusting slots. The adjusting slots 28R and 28L can be used to compensate for variations in the transmission output.

In the preferred embodiment, the front pivot points 47R and 47L of the right and left steering links 46R and 46L, are shown in FIG. 2 as comprising a post extending through a bore in the steering shaft plate 13. In another aspect of the present invention, the front pivot points 47R and 47L can include a ball joint, rather than the post. The ball joints allow the entire steering mechanism 10 to be rotated fore and aft, in the manner of a tilt steering wheel, to make it easier for the operator to get on and off the machine, and to allow the operator to place the steering wheel at more comfortable orientation. The use of a ball joint ensures that the steering shaft plate 13 will continue to operate even when the steering mechanism 10 has been tilted fore or aft.

The steering mechanism of the present invention provides significant advantages over the steering mechanisms of the prior art devices. One benefit is that the steerage, speed, and direction of operation of the vehicle is controlled entirely through a steering wheel and an accelerator foot pedal, mechanism that are familiar to most operators of the vehicle. Another benefit is that the direction of operation, that is, forward or reverse, is controlled by the foot pedal, rather than by a separate shifting mechanism. This feature not only simplifies the mechanical apparatus required for the present steering mechanism, it also simplifies the operation of the vehicle from the operator's point of view. Another principal benefit, as described more fully above, is the safety feature provided by the linkage mechanism, and particularly the floating link, that prevents a potentially dangerous combination of actual vehicle speed and actual steerage, regardless of the prescribed speed and steerage requested by the vehicle operator. Yet another benefit of the present invention is that a zero turning radius can be provided by the steering mechanism without any intervention from the operator other than prescribing a maximum steering angle on the steering mechanism. Moreover, the speed and steerage changes can be simultaneous, which enhances the maneuverability of the vehicle within which this steering mechanism is contained.

While the invention has been illustrated and described in detail in the drawings and foregoing description, the same is to be considered as illustrative and not restrictive in character, it being understood that only the preferred embodiment has been shown and described an that all changes and modifications that come within the spirit of the invention are desired to be protected.

What is claimed is:

1. A driving and steering mechanism for a vehicle having a pair of driving wheels, comprising:

reversible motor means for driving each one of said pair of driving wheels, including control means for controlling the speed and direction of rotation of each one of said pair of driving wheels independently of the other, thereby controlling the actual speed and actual steerage of the vehicle;

a steering mechanism operable by the operator of the vehicle to prescribe a steerage for the vehicle and having a first output representing said prescribed steerage;

an accelerator mechanism operable by the operator of the vehicle to prescribe a speed for the vehicle and having a second output representing said prescribed speed; and integrator linkage means, disposed between said control means and said first and second outputs, for integrating said first and second outputs into a third output, said third output being applied to said control means to coordinate the speed and direction of rotation of each of said reversible motor means in response to said prescribed steerage and said prescribed speed, and including means for reducing said actual vehicle steerage relative to said prescribed steerage as said prescribed speed is increased.

2. The driving and steering mechanism of claim 1, wherein:

said control means includes left and right transmissions controlling one each of said pair of driving wheels, each of said transmissions including a rotatable control rod, the direction and amount of rotation of which controls the speed and direction of rotation of an associated one of said pair of driving wheels, and a control link affixed at one end to said control rod having an input point at the other end of said control link; and said integrator linkage means includes left and right integrator linkages associated with a respective one of said left and right transmissions, and said third output comprises a left component output and a right component output associated with a corresponding one of said left and right integrator linkages, each one of said left and right integrator linkages including;

a floating link pivotably attached to said input point of said control link at said component output at one end of said floating link, and including a first pivot distal said component output and a second pivot situated between said component output and said first pivot;

a steering link pivotably connected at one end to said first output and at its other end to said first pivot; and an accelerator link pivotably connected at one end to said second output and its other end to said second pivot;

wherein, said means for reducing said actual steering includes said floating link.

3. The driving and steering mechanism of claim 2, wherein:

each of said left and right transmissions has a neutral state in which each of said pair of driving wheels is idle;

said accelerator mechanism includes means for biasing said mechanism to a neutral position; and each of said accelerator links associated with a corresponding on of said left and right integrator linkages includes adjustment means for adjusting the length of said accelerator link so that when said accelerator mechanism is in said neutral position each of said left and right transmissions is in said neutral state.

4. The driving and steering mechanism of claim 1, wherein:

said accelerator mechanism includes a foot pedal pivotably mounted to said vehicle, said foot pedal having a first portion at one end of said pedal and a second portion at the other end of said pedal, wherein when said first portion is depressed said second output from said accelerator means corresponds to forward motion of the vehicle when integrated by said integrator linkage means, and when said second portion is depressed said second output corresponds to reverse motion of the vehicle when integrated by said integrator linkage means.

5. A driving and steering mechanism for a vehicle having a pair of driving wheels, comprising:

reversible motor means for driving each one of said pair of driving wheels, including control means for controlling the speed and direction of rotation of each one of said pair of driving wheels independently of the other, thereby controlling the actual speed and actual steerage of the vehicle;

a steering mechanism operable by the operator of the vehicle to prescribe a steerage for the vehicle and having a first output corresponding to said prescribed steerage;

an accelerator mechanism *separate from said steering mechanism and* operable by the operator of the vehicle to prescribe a speed for the vehicle and having a second output corresponding to said prescribed speed, said accelerator mechanism also having a neutral position in which no speed is prescribed;

integrator linkage means, disposed between said control means and said first and second outputs, for integrating said first and second outputs into an input for said control means;

wherein when said steering mechanism and said accelerator mechanism are in a first state, said control means, in response to a first integrated input corresponding to said first state, operates to proportion the relative speeds of said pair of driving wheels, and when said steering mechanism and accelerator mechanism are in a second state in which said accelerator mechanism is in said neutral position, said control means in response to a second integrated input corresponding to said second state, operates to produce opposite directions of rotation for each of said pair of driving wheels.

6. The driving and steering mechanism of claim 5, wherein:

said control means includes left and right transmissions controlling one each of said pair of driving wheels, each of said transmissions including a rotatable control rod, the direction and amount of rotation of which controls the speed and direction of rotation of an associated one of said pair of driving wheels, and a control link affixed at one end to said control rod having an input point at the other end of said control link; and said integrator linkage means includes left and right integrator linkages associated with a respective one of said left and right transmissions, and said third output comprises a left component output and a right component output associated with a corresponding one of said left and right integrator linkages, each one of said left and right integrator linkages including;

a floating link pivotably attached to said input point of said control link at said component output at one end of said floating link, and including a first pivot distal said component output and a second pivot situated between said component output and said first pivot;

a steering link pivotably connected at one end to said first output and its other end to said first pivot; and an accelerator link pivotably connected at one end to said second output and its other end to said second pivot.

7. The driving and steering mechanism of claim 6, wherein:

said integrator linkage means further includes means for reducing said actual vehicle steerage relative to said prescribed steerage as said prescribed speed is increased, said steerage reducing means including each of said floating links associated with a corresponding one of said left and right integrator linkages.

8. The driving and steering mechanism of claim 7, wherein:

said steering mechanism includes a steering shaft rotatably mounted in said vehicle and having a steering wheel affixed at one end, said steering wheel being operable by the operator of the vehicle to apply a [displacement] *steerage input to provide* to said first output;

said accelerator mechanism includes a foot pedal pivotably mounted in said vehicle, said foot pedal being operable by the operator of the vehicle to apply a [displacement] *second speed input to provide* to said second output;

said steering wheel and said foot pedal being operable to simultaneously vary said first output and said second output to produce continuous changes in said actual speed and said actual steering when said first and second outputs are integrated through said left and right integrator linkages.

9. A driving *mechanism* and *independent* steering mechanism for a vehicle having a pair of driving wheels, comprising:

reversible motor means for driving each one of said pair of driving wheels, including control means for controlling the speed and direction of rotation of each one of said pair of driving wheels independently of the other, thereby controlling the forward/reverse motion, actual speed, and actual steerage of the vehicle;

a steering mechanism operable by the operator of the vehicle to prescribe a steerage *input* for the vehicle and having a first output corresponding to said prescribed steerage *input;* an accelerator mechanism operable by the operator of the vehicle to simultaneously prescribe a speed *input* and a forward-reverse direction for the vehicle and having a second output corresponding to said prescribed speed *speed* and forward-reverse direction; and integrator linkage means for integrating said [first and second outputs] *steerage and speed inputs* into [an] *a control* input for said control means, whereby said control means coordinates operation of said motor means such that the speed and direction of rotation of each one of said pair of driving wheels is proportioned according to said *control* input to produce [said] actual speed, [said] actual steerage and [said] forward/reverse motion of the vehicle.

10. The driving and steering mechanism of claim 9, wherein:

said accelerator mechanism includes a foot pedal pivotably mounted to said vehicle, said foot pedal having a first portion at one end of said pedal and a second portion at the other end of said pedal, wherein said first portion is depressed *to provide said speed input,* said second output from said accelerator means corresponds to forward motion of the vehicle *when said speed input is* integrated by said integrator linkage means, and when said second portion is depressed said second output corresponds to reverse motion of the vehicle *when said speed input is* integrated by said integrator linkage means.

11. The driving and steering mechanism of claim 9, wherein:

said control means includes left and right transmissions controlling one each of said pair of driving wheels, each of said transmissions including a rotatable control rod, the direction and amount of rotation of which controls the speed and direction of rotation of an associated one of said pair of driving wheels, and a control link affixed at one end to said control rod having an input point at a first length from said one end of said control link; and said integrator linkage means includes;

left and right floating links pivotably attached at one end to said input point of a respective one of said control links associated with said left and right transmissions, each of said left and right floating links having a first pivot at a second length from said input point and a second pivot situated between said input point and said first pivot at a third length from said input point;

first means for connecting said first output of said steering mechanism to said first pivot on each of said left and right floating links; and second means for connecting said second output from said accelerator mechanism to said second pivot of each of said left and right floating links;

wherein, displacements imposed on said first output by said steering mechanism and on said second output by said accelerator mechanism cause said first pivot and said second pivot on each of said left and right floating links to move in curvilinear paths geometrically defined by said first, second and third lengths, resulting in a corresponding rotation of each of said control rods associated with said left and right transmissions; and further wherein rotation of each of said control rods in one direction produces forward motion of the vehicle, and rotation of each of said control rods in another direction produces reverse motion of the vehicle.

12. The driving and steering mechanism of claim 11, wherein:

rotation of each of said control rods through different angles produces said actual steerage; and rotation of each of said control rods in opposite directions also produces said actual steerage in which the vehicle moves in a zero radius turn.

13. A driving and steering mechanism for a vehicle having a pair of driving wheels, comprising:

reversible motor means for driving each one of said pair of driving wheels, including control means for controlling the speed and direction of rotation of each one of said pair of driving wheels independently of the other, thereby controlling the forward/reverse motion, actual speed and actual steerage of the vehicle;

a steering mechanism, including a rotatable steering wheel, operable by the operator of the vehicle to prescribe a steerage *input* for the vehicle and having a first output corresponding to said prescribed steerage *input;* an accelerator mechanism, including a pivotable foot pedal, for prescribing a speed *input* for the vehicle and including a second output corresponding to said prescribed speed *input;* integrator means for integrating said first and second [outputs] *inputs and said resulting first and second outputs* into a third output, said third output being applied to said control means, said integrator means being continuously operable while the vehicle is in motion to provide changes in the forward-/reverse motion, actual speed and actual steerage of the vehicle while said steering wheel and said foot pedal are *capable of being* simultaneously *and independently* operated by the operator of the vehicle, and including means for preventing tipping of the vehicle by reducing said actual steerage relative to said prescribed steerage as said prescribed speed is increased, and by limiting the prescribed speed to a predetermined maximum value for each prescribed steerage such that said predetermined maximum speed value is decreased as the prescribed steerage is increased.

14. In a vehicle having a pair of driving wheels, the improvement comprising:

a steering mechanism rotatably mounted to the vehicle and rotatable by the operator of the vehicle to prescribe a steerage for the vehicle, said steering mechanism including a plate rotatable with said mechanism and having a pair of ends;

an accelerator mechanism pivotably mounted to said vehicle and pivotable by the operator of the vehicle to prescribe a speed for the vehicle, said accelerator mechanism including a bracket pivotable with said mechanism and having a pair of ends;

an independent driving and steering mechanism for each one of said driving wheels, each of said driving and steering mechanisms including:

a reversible motor for driving said driving wheel;

a transmission operably associated with said reversible motor for controlling the speed and direction of rotation of said motor;

a control arm pivotably mounted at one end to said transmission and operable to control said transmission, said control arm having an input point;

a floating link pivotably attached to said input point of said control arm at a control pivot at one end of said floating link, and having a first pivot distal said control pivot and a second pivot between said control pivot and said first pivot, wherein alternatively one of said first pivot and second pivot operates as a temporary fixed pivot axis for said floating link such that a displacement imposed on the other of said first pivot and second pivot causes said floating link to pivot about said temporary fixed pivot axis;

a first link pivotably connected at one end of said first link to one of said first or said second pivots and pivotably connected at its other end to one of said pair of ends of said steering mechanism link, whereby rotation of said steering mechanism link causes said first link to translate, thereby imposing a displacement on said one of said first or said second pivots; and a second link pivotably connected at one end of said second link to the other of said first or said second pivots and pivotably connected at its other end to one of said pair of ends of said accelerator mechanism bracket, whereby pivoting of said accelerator mechanism bracket causes said second link to translate, thereby imposing a displacement on said other of said first or said second pivots.

15. In the vehicle according to claim 14, the improvement wherein:

for each of said driving and steering mechanisms;

said first link is connected at its one end to said first pivot and said second link is connected at its one end to said second pivot;

said input point on said control arm is at a first length from said one end of said control arm;

said first pivot on said floating link is at a second length from said control pivot;

said second pivot on said floating link is at a third length from said control pivot;

wherein, displacements imposed on said first link by said steering mechanism and on said second link by said accelerator mechanism cause said first pivot and said second pivot on each of said floating link to move in cirvilinear paths geometrically defined by said first, second and third lengths, resulting in a corresponding rotation of each of said control arm associated with said transmission; and further wherein rotation of said control arms associated with each one of the driving wheels in one direction produces forward motion of the vehicle, and rotation of said control arms in another direction produces reverse motion of the vehicle.

16. In the vehicle according to claim 14, the improvement wherein:

rotation of said control arms associated with each one of the driving wheels through different angles produces steerage for the vehicle; and rotation of said control rods associated with each one of the driving wheels in opposite directions also produces steerage for the vehicle in which the vehicle moves in a zero radius turn.

17. In the vehicle according to claim 14, the improvement wherein:

said transmissions associated with each one of the driving wheels has a neutral state in which the driving wheel is idle;

said accelerator mechanism includes means for biasing said mechanism to a neutral position; and for each of said driving and steering mechanisms, said second link includes a turnbuckle having a variable length for adjusting the length of said second link so that when said accelerator mechanism is in said neutral position said transmission is in said neutral state.

*18. A driving mechanism and an independent steering mechanism for a vehicle having a pair of driving wheels, comprising:*

*reversible motor means for driving each one of said pair of driving wheels, including control means for controlling the speed and direction of rotation of each one of said pair of driving wheels independently of the other, thereby controlling the actual speed and actual steerage of the vehicle;*

*a steering mechanism operable by the operator of the vehicle to prescribe a steerage for the vehicle and having a first output representing said prescribed steerage;*

*an accelerator mechanism operable by the operator of the vehicle to prescribe a speed for the vehicle and having a second output representing said prescribed speed with said accelerator mechanism mechanically independent of said steering mechanism; and*

*integrator linkage means, disposed between said control means and first and second outputs, for integrating said first and second outputs into a third output, said third output being applied to said control means to coordinate the speed and direction of rotation of each of said reversible motor means in response to said prescribed steerage and said prescribed speed, and including means for reducing said actual vehicle steerage relative to said prescribed steerage as said prescribed speed is increased.*

*19. A driving and steering mechanism for a vehicle having a pair of driving wheels, comprising:*

*reversible motor means for driving each one of said pair of driving wheels, including control means for controlling the speed and direction of rotation of each one of said pair of driving wheels independently of the other, thereby controlling the actual speed and actual steerage of the vehicle;*

*a steering mechanism operable by the operator of the vehicle to prescribe a steerage for the vehicle and having a first output corresponding to said prescribed steerage input;*

*an accelerator mechanism having a speed input and operable by the operator of the vehicle to prescribe a speed for the vehicle and having a second output with said accelerator mechanism mechanically independent of said steering mechanism such that said steerage input is provided by mechanical components different from those components providing said accelerator input and having a second output corresponding to said prescribed speed, said accelerator mechanism also having a neutral position in which no speed is prescribed;*

*integrator linkage means, disposed between said control means and said first and second inputs, for integrating said first and second outputs into an input for said control means;*

*wherein when said steering mechanism and said accelerator mechanism are in a first state, said control means, in response to a first integrated input corresponding to said first state, operates to proportion the relative speeds of said pair of driving wheels; and*

*when said steering mechanism and accelerator mechanism are in a second state in which said accelerator mechanism is in said neutral position, said control means in response to a second integrated input to said control means corresponding to said second state, operates to produce opposite directions of rotation for each of said pair of driving wheels.*

*20. A driving mechanism and an independent steering mechanism for a vehicle having a pair of driving wheels, comprising:*

*a steering mechanism operable by the operator of the vehicle to prescribe a steerage input for the vehicle and*

*having a first output corresponding to said prescribed steerage input;*

*an accelerator mechanism operable by the vehicle operator to simultaneously prescribe a speed input and having a second output corresponding to said prescribed speed input; and*

*integrator means for integrating said steerage input and said speed input into a control input for said control means, whereby said control means coordinates operation of said motor means such that the speed and direction of rotation of each one of said pair of driving wheels is proportioned according to said control input to product the actual speed, the actual steerage and said forward/reverse motion of the vehicle.*

*21. A lawn maintenance vehicle having a pair of driving wheels, comprising:*

*a pair of hydraulic motors for independently driving the driving wheels, each of said hydraulic motors including a steering wheel and rotatable control shaft for controlling the speed and direction of rotation of said motor;*

*a steering wheel assembly including a rotatable steering shaft;*

*a speed control mechanism including a user-actuable speed control member mounted for rotation around a substantially horizontal pivot axis; and*

*an integrator linkage coupled to said rotatable steering shaft, said speed control member and each of said control shafts for integrating independent movements of said steering shaft and said speed control member into a combined movement of said control shafts so that pivoting movement of said speed control member results in substantially similar changes in the operating speeds of said hydraulic motors while rotational movement of said steering shaft results in dissimilar changes in the operating speeds of said hydraulic motors.*

* * * * *

UNITED STATES PATENT AND TRADEMARK OFFICE

CERTIFICATE OF CORRECTION

PATENT NO. : RE 34057

DATED : September 8, 1992

INVENTOR(S) : Tommy A. Middlesworth

It is certified that error appears in the above-identified patent and that said Letters Patent is hereby corrected as shown below:

| | |
|---|---|
| On the title page, item (64): ("Related U.S. Patent Documents") | cancel "7,903,992" and insert -- 4,790,399 --; |
| Column 12, Line 32, | cancel "steerage" and insert -- first --; |
| Column 12, Line 37, | cancel "apply" and insert -- provide --; |
| Column 12, Line 63, | cancel "speed" in the second occurrence, and insert -- input -- in italics; |
| Column 12, Line 67, | cancel the word "control" in the first occurrence in italics and insert -- control -- without italics; |
| Column 15, Line 35, | cancel "cirvilinear" and insert -- curvilinear --. |

Signed and Sealed this

Thirtieth Day of November, 1993

*Attest:*

*Attesting Officer*

Bruce Lehman

BRUCE LEHMAN

*Commissioner of Patents and Trademarks*